United States Patent

Re. 28,392

Reissued Apr. 15, 1975

28,392

MAGNETO IGNITION SYSTEM FOR INTERNAL COMBUSTION ENGINES AND THE LIKE

Bobby E. McMillen, Columbus, Miss., assignor to Ambac Industries, Incorporated

Original No. 3,326,199, dated June 20, 1967, Ser. No. 388,360, Aug. 10, 1964. Application for reissue June 18, 1968, Ser. No. 748,575

Int. Cl. F02p *1/00*

U.S. Cl. 123—149 A 19 Claims

Matter enclosed in heavy brackets [ ] appears in the original patent but forms no part of this reissue specification; matter printed in italics indicates the additions made by reissue.

*ABSTRACT OF THE DISCLOSURE*

*A magneto in which electronic switching replaces the usual breaker points.*

The present invention relates to improvements in magneto ignition systems for internal combustion engines, in which the conventional breaker points and the condenser connected across the breaker points are replaced by electronic circuits.

In conventional magneto ignition systems, it is customary to use an engine-driven magnetic induction rotor, the rotation of which produces in a magnetic circuit an alternating magnetic flux which cuts a primary winding each time the flux in the magnetic circuit changes. The primary winding is connected across a set of cam-actuated breaker points. The alternating magnetic flux induces a current in the primary winding during the intervals when the breaker points are closed. The [voltage] *current* induced in the primary winding varies, with the maximum being at *approximately* the point where the flux reverses. [Also, at this point the maximum current in induced in the primary winding.] At the instant the maximum current is flowing in the primary winding, the breaker points are opened, instantly breaking the current in the primary winding, thereby causing the immediate collapse of the magnetic field created by the current flow in the winding. The resultant fast rate of change of flux induces a high voltage in a secondary winding located near the primary. The high voltage in the secondary winding is then conducted to an ignition spark plug and occurs at the appropriate time to fire the combustible fuel in the associated engine cylinder. The proper timing of the high voltage ignition pulse with respect to the firing order and timing of the engine is accomplished by the design of the point-acutating cam, the distributor, and the magneto rotor driving connection to the engine.

The breaker points are the main cause of the ignition system malfunction and probably are the most frequently serviced component of the system. The points frequently burn, pit, corrode and require periodic setting, causing costly shutdown time of the engine. A condenser is connected across the breaker points to relieve the arcing condition as the points open. The condenser itself is a source of trouble in many applications due to the fact that it either becomes open and does not protect the points, or shorts internally and effectively grounds out the magneto.

Many ignition systems have recently been developed to replace the usual breaker apparatus with electronic circuitry. These circuits have employed complex electronic circuitry which has deviated in many respects from the conventional magneto ignition circuit in order to alleviate the undersirable characteristics of the breaker apparatus. Because of the complex circuitry and deviations from the conventional magneto ignition circuit, these systems have not been entirely compatible with, or readily capable of being substituted into, the conventional magneto ignition systems circuit to replace the breaker apparatus employed.

Accordingly, it is an object of the present invention to provide an ignition system which is readily substitutable into and conformable with ignition systems of conventional types.

Another object of the present invention is to provide an ignition system which is new and improved in construction, economical, and capable of successful operation on engines having any number of cylinders.

Another object is to provide a new and improved ignition system which eliminates the conventional breaker apparatus and provides high engine efficiency.

It is also an object to provide a new and improved ignition system for maintaining proper timing of combustion firing.

In accordance with the present invention, these and other objectives are achieved by providing a new and improved ignition system with novel features which cooperate to accomplish the above objectives. The present invention employs an electronically-controllable current-switching circuit, having a high conduction state and a low conduction state. The current-switching circuit is actuatable between its high and low conduction states in response to an electrical control pulse signal applied to it. The current-switching circuit is coupled in parallel with the series combination of a voltage-operable engine fuel igniting means for igniting combustible fuel in the engine and distributor means for distributing voltage pulses to the engine fuel igniting means. The ignition system of the present invention also comprises means for generating a series of [ignition voltage] pulses in synchronism with operation of the engine. In the preferred arrangement these [ignition voltage] pulses are applied across the current-switching circuit. Also employed are means for generating a control pulse signal comprising pulses recurrent in synchronism with engine operation. This control pulse signal is applied to the current-switching circuit to actuate it to its high conduction state during an interval of initial build-up of each of the [voltage] pulses of the series to a predetermined level and to its low conduction state during an interval in which each of the [voltage] pulses of the series exceeds the predetermined level [whereby the portion of the generated voltage pulses of the series exceeding the predetermined level are used to ignite the combustible fuel in the engine fuel igniting means].

When the current-switching circuit is actuated to its low conduction state, current produced by the ignition voltage pulses flows substantially only in the series circuit of the distributor means and engine fuel igniting means to produce voltage pulses for igniting the combustible fuel in the engine.

More particularly, according to the present invention in a preferred form an ignition system for an internal combustion engine is provided having an ignition magneto induction generator for generating a series of [voltage] pulses of alternately opposite polarity. The alternately opposite polarity pulses are supplied to a rectifying means for converting the pulses to pulses of a same polarity. The [voltage] pulses from the rectifying means are supplied across an electronically-controllable current-switching circuit. A triggering control pulse signal is produced by a triggering induction generator and applied to the current-switching circuit to shift it between its high to its low conduction state. The triggering induction generator has its rotor operated in synchronism with engine operation and with rotation of the rotor of the magneto induction generator. The [voltage] pulses from the magneto induction rotor are supplied across a parallel-connected circuit having the current-switching circuit in one branch and the distributor and engine fuel igniting means in the other branch. When the current-switching circuit is in its low conduction state the current produced by the *ignition* voltage pulses flows substantially only through the distributor and engine fuel igniting means, whereby the *ignition* voltage pulses are used to ignite the combustible fuel in cylinders of the engine.

In accordance with a further feature of the invention, the triggering control pulse signal supplied to the current-switching circuit may be produced by the ignition magneto induction generator itself by providing a separate coil thereon and a separate rectifying means for the control pulse signal produced thereby, to derive a control pulse signal comprising a series of pulses of a same polarity supplied to the current-switching circuit to change it between its high to its low conduction states.

The ignition system of the present invention performs equally as well to achieve high engine efficiency in high tension or low tension ignition systems. In the high tension system, the high voltage sufficient to fire the spark plug is generated in a secondary winding at the magneto and is conducted directly to the spark plug. In the low tension system a relatively high current at low voltage is generated in an output winding of the magneto, the usual secondary winding at the magneto not being used. This current is conducted to a primary winding of a voltage step-up transformer located near the spark plug to be fired. The secondary winding of this transformer is connected across the spark plug. The low tension systems are particularly suited for use with large engines where the magneto is located at some distance from the cylinders.

For a better understanding of the present invention, reference is made to the following drawings wherein.

Figure 1:
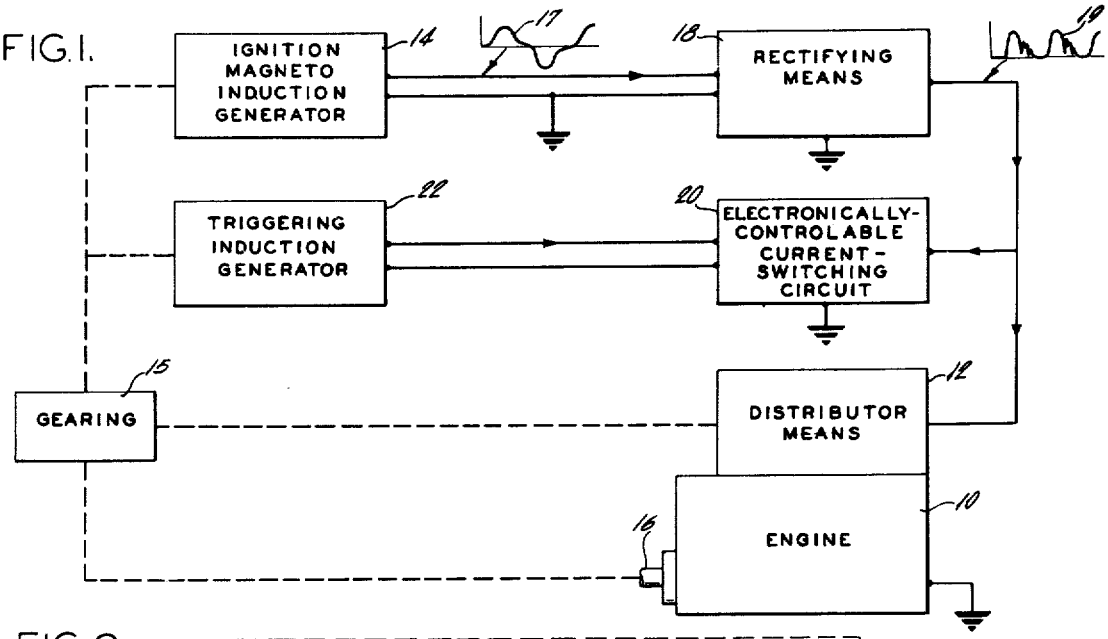
FIG. 1 is a block diagram illustrating an over-all system embodying the present invention.

Referring to FIG. 1, an over-all system embodying the present invention will be seen. The ignition system is used in conjunction with an engine 10 which may be a conventional gasoline engine and, for purposes of illustration, it will be assumed that the engine is of the four-cycle type and has four cylinders each of which is provided with an associated spark plug for igniting combustible fuel in the corresponding cylinder. The proper timing relation for firing the fuel in the engine cylinders in regulated by the distributor means 12, which may comprise a conventional distributor and step-up transformers in the circuit of each spark plug for increasing the voltage pulse to the level required for firing the associated spark plug.

In order to produce the proper voltage pulses to the distributor means 12 in the proper time sequence to fire the spark plugs, an ignition magneto induction generator 14 is provided which generates a train of [voltage] pulses of alternately opposite polarity. The rotor in ignition magneto induction generator 14 is connected to rotate in synchronism with the rotation of crank shaft 16 by means of gearing 15 which produces the proper relationship of frequency of rotation of the crank shaft 16 to the number of pulses supplied to the distributor means 12. It is assumed that the magneto induction generator 14 provided here is of the type that produces one positive and one negative output pulse for each revolution of its rotor, in which case the gearing ratio between the crank shaft and the rotor of the magneto is 1:1, two pulses being produced from the magneto for each revolution of the crank shaft. It should be noted that when the ignition system is used with engines having more than four cylinders, the required greater number of [voltage] pulses to the distributor means may be provided by increasing the gearing ratio and/or the number of poles of the magneto.

The rectifying means 18 is supplied with the alternately opposite polarity [voltage] pulses from the ignition magneto induction generator 14, the [voltage] waveform being similar to that shown at 17. The output of rectifying means 18 is a sequence of [voltage] pulses of the same frequency of recurrence as the alternately opposite polarity input pulses but of a same polarity, having a waveform similar to that shown at 19.

The [voltage] pulses from the rectifying means 18 are applied across the parallel-connected circuit comprising in one branch the electronically-controllable current-switching means 20 and in the other branch the series circuit comprising the distributor means and spark plugs. The electronically-controllable current-switching circuit has a high conduction state and a low conduction state and is actuatable between these states in response to an electrical control pulse signal applied to it from triggering induction generator 22. When the electronically-controllable current-switching circuit is in its high conduction state, it provides a shunting circuit to a source of reference potential, designated as electrical ground. More particularly, the current produced in the parallel circuit by the [voltage] pulses applied across it will flow through the current-switching circuit, since it provides a short circuit to electrical ground, thus pulling down the value of voltage across the circuit. When the current-switching circuit is in its low conduction state, [the] current [produced in] *applied to* the parallel circuit [by the voltage pulses applied across it] will flow only in the series circuit of the distributor means and spark plugs *when the distributor means completes the circuit* to fire the spark plugs, since the current-switching circuit is essentially an open circuit at this period.

As mentioned above, the electronically-controllable current-switching circuit is shifted between its high and its low conduction states by a control pulse signal applied to it from the triggering induction generator 22. The triggering induction generator 22 may comprise an output winding on a core and a rotating magnet rotor polarized to induce in the output winding a triggering control pulse signal comprising a series of alternately opposite polarity pulses, which are supplied to the current-switching circuit in the proper time sequence for shifting or triggering the current-switching circuit between its high and its low conduction states. During the build-up of the [ignition voltage] *current* pulses *in the magneto induction generator* toward their maximum value, the current-switching circuit is actuated to its high conduction state, and, at approximately the point of maximum value of the [voltage] *current* pulses, the current-switching circuit is actuated to its low conduction state so that the current *collapses to* [produced by the] *produce an ignition* voltage *pulse which is conducted* [pulses then flows] substantially only through the distributor means and spark plugs. The rotor of the triggering inductive generator is geared to the crank shaft 16 through gearing 15 to provide proper timing for supplying the ignition voltage pulses to the voltage distributor means to fire the spark plugs at the appropriate times. The rotor on triggering induction generator 22 is geared to crank shaft 16 of engine 10 by a 1:1 gear ratio in this example, the triggering induction generator producing two pulses of the same polarity for each complete revolution of its rotor.

Figure 2:
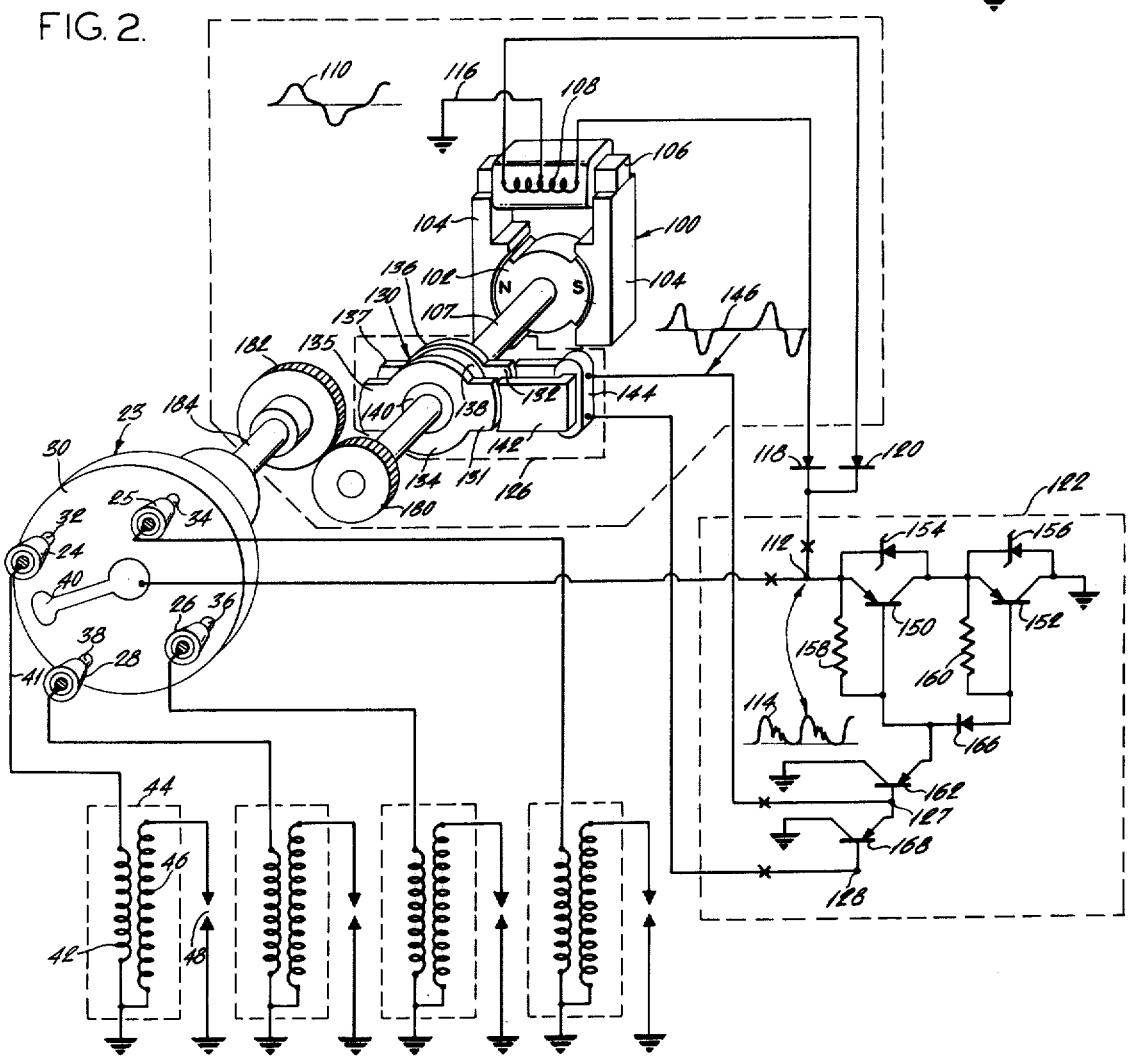
FIG. 2 is a schematic diagram of an ignition system embodying one form of the present invention.

Referring to FIG. 2, a detailed schematic diagram of the circuitry and structure of a system embodying one form of the present invention is shown. The distributor means is shown comprising a distributor generally designated 23 having four fixed electrical brush holders 24, 25, 26 and 28 located in circumferentially-spaced relation with respect to the axis of rotation of distributor rotor disc 30. In each of the holders an electrical brush is located, brush 32 in holder 24, brush 34 in holder 25, brush 36 in holder 26 and brush 38 in holder 28, each brush being in physical contact with the rotor disc 30 so as to ride over it. As rotor disc 30 rotates, the conductive segment 40 thereon will pass under and make contact with each of the brushes successively. Attached to each brush through the brush holder is a conductive lead which connects directly to a respective primary widing of a transformer, such as lead 41 connecting brush 32 in holder 24 to primary winding 42 of transformer 44. Also located in voltage step-up transformer 44 is a secondary winding 46 which has associated with it a spark plug 48, which has one of its terminals connected to electrical ground and the other connected to the high-potential end of the secondary winding 46. Each of the other brushes, 34, 36 and 38 is connected to the primary widing of a different associated voltage step-up transformer which has its secondary connected across an associated spark plug in the same manner as described with reference to brush 32, transformer 44 and spark plug 48. The present system, in which a relatively high current at low voltage is generated at the magneto and the voltage then stepped up at the engine sufficiently to fire the spark plugs, is referred to as a low tension system.

The voltage pulses used to fire the spark plugs are generated by the ignition magneto induction generator generally designated 100. The magneto induction generator comprises a rotor assembly 102 including a permanent magnet with north and south poles as designated thereon. The rotor 102 revolves in a two-piece laminated magnetic frame structure 104 having a laminated magnetic core 106 around which a center-tapped output coil 108 is wound to replace the usual primary and secondary coils of a conventional magneto. As the rotor 102 rotates about the axis of its drive shaft 107 within the frame 104, an alternating magnetic flux is created in the magnetic frame structure causing a build-up and collapse of flux lines within the laminated core 106 and output coil 108, resulting in an induced voltage within coil 108. The *pulses* [voltage] produced in output coil 108 [has] *have* a waveform, similar to that shown at 110 for each complete revolution of the rotor 102, which comprises movement of the rotor about the shaft 107 through 360 degrees.

The *pulses* [voltage pulse] from coil 108 [is] *are* rectified in a manner to produce [voltage] pulses of the same polarity at terminal 112, the rectified waveform being similar to that shown at 114. The rectifying means for this purpose is provided by the center tap 116 to electrical ground on output coil 108 and diodes 118 and 120, which have their respective anodes connected to opposite ends of output coil 108 and their cathodes connected by electrical connectors to terminal 112. By this arrangement, the rectifying means provides full wave rectification.

The [voltage] pulse supplied to terminal 112 may cause a current to flow through the electronically-controllable current-switching circuit, generally designated 122, to electrical ground depending on the conduction state of current-switching circuit. The current-switching circuit has a high conduction state and a low conduction state and is actuatable between these states in response to electrical control pulses applied thereto. The control pulse signal for shifting or triggering the current-switching circuit is produced by the triggering inductive generator, generally designated 126, and applied between terminals 127 and 128. The rotor assembly 130 of triggering induction generator 126 is mounted on shaft 107.

Figure 3:
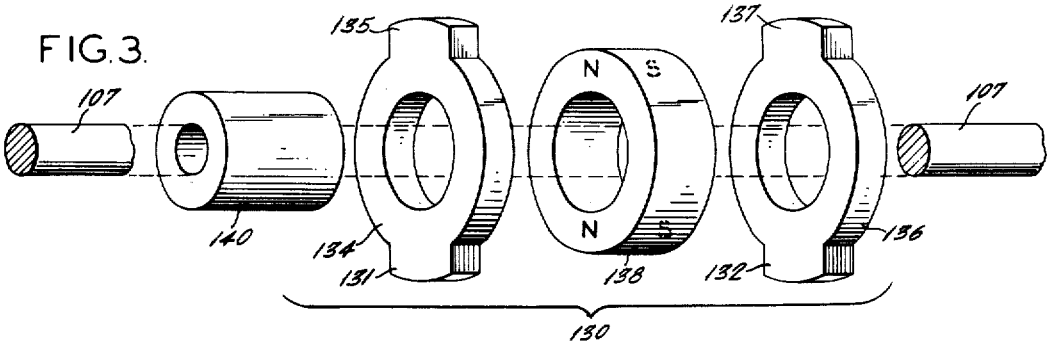
FIG. 3 is an enlarged exploded perspective view of the triggering rotor assembly of the system of FIG. 2.

The detailed structure of the rotor assembly 130 can best be seen by reference to FIG. 3, where an enlarged exploded perspective view of the rotor assembly is shown. As can be seen, the rotor assembly comprises two rotor poles pieces 134 and 136 located on opposite sides of permanent magnet 138, which is polarized with north and south poles as designated thereon. The pole pieces 134 and 136 and magnet 138 are mounted on nonmagnetic sleeve 140, which is positioned over shaft 107.

Referring again to FIG. 2, the rotor revolves in close proximity to a generally U-shaped laminated core 142. By this arrangement, the magnetic flux emanating from magnet 138 completes its path through extensions 131 and 133 on one side of the rotor by the path provided by core 142 when the extensions rotate in close proximity to the core. Also, in the same manner the magnetic flux from the magnet through extensions 135 and 137 on the other side of the rotor completes a path through core 142 when the extensions rotate in close proximity to the core. As the rotor rotates, magnetic flux through laminated core 142 increases and decreases depending on the relationship of the extensions to the core, resulting in an induced voltage within the windings of coil 144 wound on core 142. The coil 144 has one end connected to terminal 127 and the other end connected to terminal 128. As a result, a voltage waveform similar to that shown at 146, having four pulses, is produced across the coil and applied between terminals 127 and 128, two positive and two negative pulses being generated for each revolution of the rotor assembly.

The electronically-controllable current-switching circuit 122 comprises a transistor 150 with its emitter connected to terminal 112 and its collector connected to the emitter of transistor 152, which has its collector connected to ground. Zener diodes 154 and 156 are connected between the collector and emitter of transistors 150 and 152, respectively, to protect the transistors from high transient voltages. The biasing resistors 158 and 160 are connected in the emitter-base circuits of transistors 150 and 152, respectively. The bases of transistors 150 and 152 are connected to the emitter of transistor 162 which has its collector connected to ground. A blocking diode 166 is connected between the bases of transistors 150 and 152 to isolate the bases of the transistors from one another. The base of transistor 162 is connected to terminal 127 and to the emitter of transistor 168, which has its collector grounded. The base of transistor 168 is connected to terminal 128. When the transistors in the electronically-controllable current-switching circuit are conducting, the current-switching circuit is in its high conduction state. When the transistors are rendered non-conductive, the current-switching circuit is in its low conduction state.

In operation, when a particular engine piston is in a position for which its associated spark plug is to be fired, the conductive segment 40 will be under the associated brush to connect the input of the distributor to that spark plug. For example, when spark plug 48 is ready to be fired, conductive segment 40 is under brush 32 to connect the input of the distributor to spark plug 48. At this instant, through the synchronism of the gearing, the permanent magnet of rotor assembly 102 is in such a position as to have just started flux reversal in output coil 108. At this point, maximum voltage output is induced in the output coil. Prior to these occurrences the current-switching circuit has been in its high conduction state. The condition of the current-switching circuit being in its high conduction state is caused by the triggering rotor assembly 130 being in such a position of its rotation as to produce a rapid change in magnetic flux flowing through core 142, to thereby induce a positive voltage control pulse in coil 144. This voltage control pulse is applied between the emitter and the base of transistor 168, and thereby drives the transistor into conduction. This condition causes transistor 162 to go into conduction, which in turn causes transistors 150 and 152 to conduct, thus closing the current-switching circuit from terminal 112 to electrical ground by way of transistors 150 and 152. At the firing instant, the positive voltage control pulse will have ceased and the transistors will have returned to their non-conductive states. Also, the negative voltage control pulse produced by the triggering rotor assembly is applied between terminals 127 and 128, thereby further assuring that transistor 168 and hence transistors 162, 150 and 152 are rendered non-conductive. At this firing instant, *when the current-switching circuit returns to its low conduction state,* the current [produced by] *in the magneto coil collapses to produce* the *ignition* voltage pulse [supplied] *conducted* to terminal 112 [therefore flows] through the distributor and out brush 32 to transformer primary 42. The resultant surge of current in traansformer primary 42 produces a high voltage surge in the secondary winding 46 thereof, thus firing spark plug 48 connected across winding 46. After the spark plug 48 has fired, the distributor rotor disc 30 will continue to rotate so that brush 32 rests on the insulating area of the rotor disc, thereby opening the circuit to spark plug 48. Simultaneously, the triggering rotor assembly 130 will continue to rotate away from core 142 [so as to stop generating a voltage control pulse], and the current-switching circuit therefore is in its low conduction state. This same cycle repeats itself through the firing of each of the four spark plugs.

The proper sequence of timing is achieved by gearing between the rotor 102 of magneto induction generator 100, rotor 130 of triggering inductive generator 126, the distributor rotor disc 30 and the engine crank shaft. As can be seen in FIG. 2, the shaft 107 is attached directly to rotor assembly 102 of the magneto induction generator 100 and to rotor 130 of triggering inductive generator 126, so that for each revolution of the rotor 102 there is one revolution of the rotor 130. The gearing between snaft 107 and the distributor rotor disc 130 is provided through gears 180 and 182, gear 182 being connected to rotor disc 30 by shaft 184 and gear 180 being connected on the end of shaft 107. By this arrangement, the proper timing for providing the control pulse signal to change the current-switching circuit from its low to high conduction states is achieved at the [itme] *time* the ignition *voltage* pulse from the magneto is supplied to terminal 112.

Figure 4:
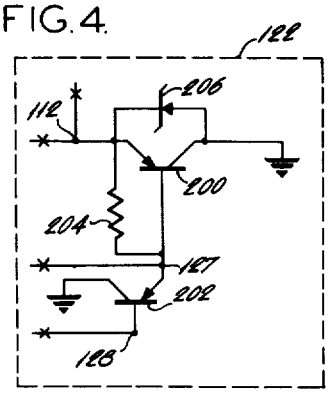
FIG. 4 is a schematic diagram of an alternative form of a portion of the electrical system of FIG. 2.

FIG. 4 illustrates an alternative form for the electronically-controllable current-switching circuit 122 of FIG. 2. The current-switching circuit shown in FIG. 4 is a simplified version in that it has only two transistors 200 and 202. The path from terminal 112 through the current-switching circuit to electrical ground is provided through transistor 200, which has associated with it a biasing resistor 204 and a zener diode 206. The zener diode protects the transistor from high transient voltages. The base of transistor 200 is connected to terminal 127 and to the emitter of transistor 202, which has its collector connected to electrical ground. The base of transistor 202 is connected to terminal 128. As indicated by the breaks in the circuit at terminals 112, 127 and 128, the current-switching circuit of FIG. 4 can be inserted in place of the current-switching circuit shown between those points in FIG. 2. The general function of both circuits is the same. The positive control pulse signal from the triggering inductive generator applied between terminals 127 and 128 drives transistor 202 into conduction which in turn drives transistor 200 into conduction, thus changing the current-switching circuit from its low to high conduction state during the build-up of [voltage of the ignition pulse] *current in the magneto coil 108*. Then at the firing instant, approximately when the maximum value of the [ignition voltage] *current* pulse is reached, the transistors will have returned to their non-conductive states. Again, the negative control pulse from the triggering induction generator assures this condition. The choice between the two current-switching circuits depends on the operating characteristics of the current-switching circuit components and on the related components of the ignition system assembly.

Figure 5:
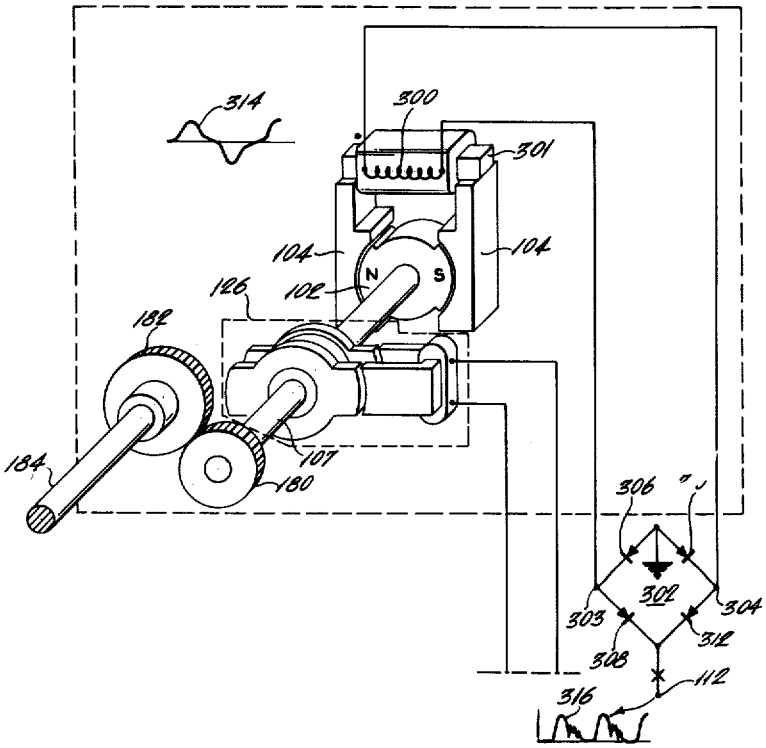
FIG. 5 is a schematic diagram showing an alternative form of another portion of the system of FIG. 2.

FIG. 5 illustrates an alternative form for the rectifying means of FIG. 2. The only difference between the circuit shown in FIG. 5 and that shown in FIG. 2 is in the connections of the magneto output coil and the associated circuitry for rectifying the voltage pulses produced by the magneto induction generator. In the FIG. 5 arrangement, opposite ends of the output coil 300 wound on laminated core 301 are connected respectively to opposite junctions 303 and 304 of a full-wave rectifier circuit 302. More specifically, the full-wave rectifier circuit 302 comprises a first diode 306 having its anode grounded and its cathode connected to the bridge junction 303, a second diode 308 having its anode connected to junction 303 and its cathode connected by electrical conductors to terminal 112, a third diode 310 having its anode grounded and its cathode connected to junction 304, ad a fourth diode 312 having is anode connected to junction 304 and its cathode connected by electrical conductors to terminal 112. The [voltage] *pulses* in output coil 300 produced by the magneto [has] *have* waveform similar to that shown at 314, and, as a result of the full-wave rectifier circuit 302, the [voltage] *pulses* at terminal 112 [has] *have* a waveform similar to that shown at 316. By this arrangement, the opposite polarity pulses produced by the magneto induction generator are converted by the rectifying means to pulses of the same polarity.

Figure 6:
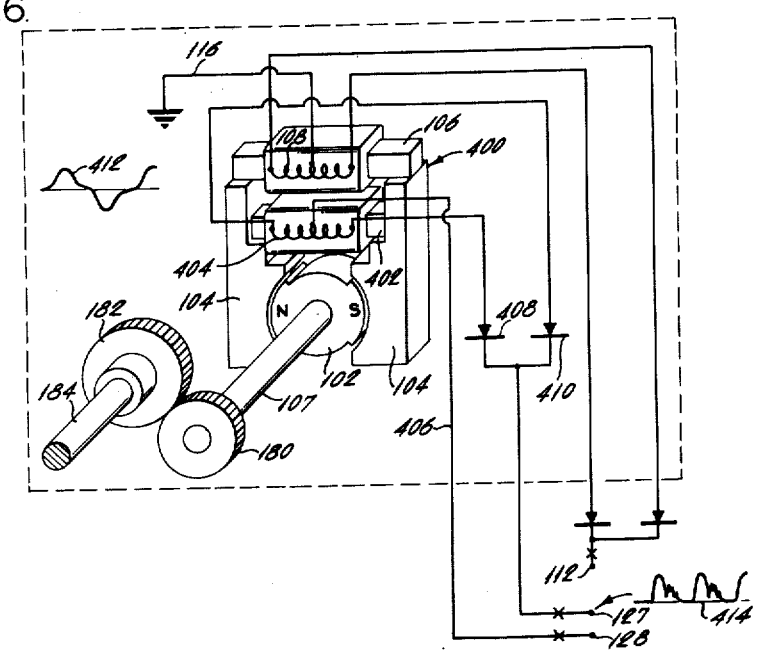
FIG. 6 is a schematic diagram showing a means for producing triggering pulses from a main magneto induction generator.

Referring to FIG. 6, there is shown an arrangement for producing the control pulse signal which is an alternative to that illustrated in FIG. 2. As can be seen in FIG. 6, the triggering induction generator has been removed from shaft 107 and the main magneto induction generator generally designated 400 is used to produce the control pulse signal which changes the current-switching circuit means between its high to low conduction states. To produce the triggering pulses the main magneto 400 is provided with an additional laminated core 402 which rests on the two-piece laminated frame structure 104. Output coil 404 is wound on core 402 to produce the control pulses to change the current-switching circuit to its high conduction state. Output coil 404 has a center tap 406 connected to termial 128 and the outside ends of the coil 404 are connected to the anodes of diodes, one side to diode 408 and the other side to diode 410, which diodes have their cathodes connected by electrical connectors to terminal 127. As the rotor 102 rotates about shaft 107 within frame 104, an alternating magnetic flux is created in the frame structure, causing a build-up and collapse of flux lines within coil 404, resulting in a voltage induced in the coil, the maximum voltage occurring at *approximately* the point of flux reversal. At this point, sufficient voltage is induced in output trigger coil 404 to change the current-switching circuit instantaneously to its high conduction state. Then at the firing instant, when approximately the maximum [ignition-voltage] *current* pulse is induced in output coil 108, the positive control pulse will be such that the current-switching circuit will have returned to its low conduction state. Thus, at the firing instant, the [surge] *collapse* of current [produced by] *produces* the voltage induced in output coil 108 *which* is conducted to the distributor to produce the voltage to fire the spark plugs. The output coil 404 has the center tap and diode connections in order to provide full wave rectification so that the control pulses of alternatively opposite polarity induced in output triggering coil 404 are converted to pulses of a same polarity supplied to the current-switching circuit. There is produced across output triggering coil 404 a voltage waveform similar to that shown at 412 for each complete revolution of the rotor 102, and as a result of the full wave rectifier circuit, there is produced a voltage waveform similar to that shown at 414 at terminal 127.

Figure 7:
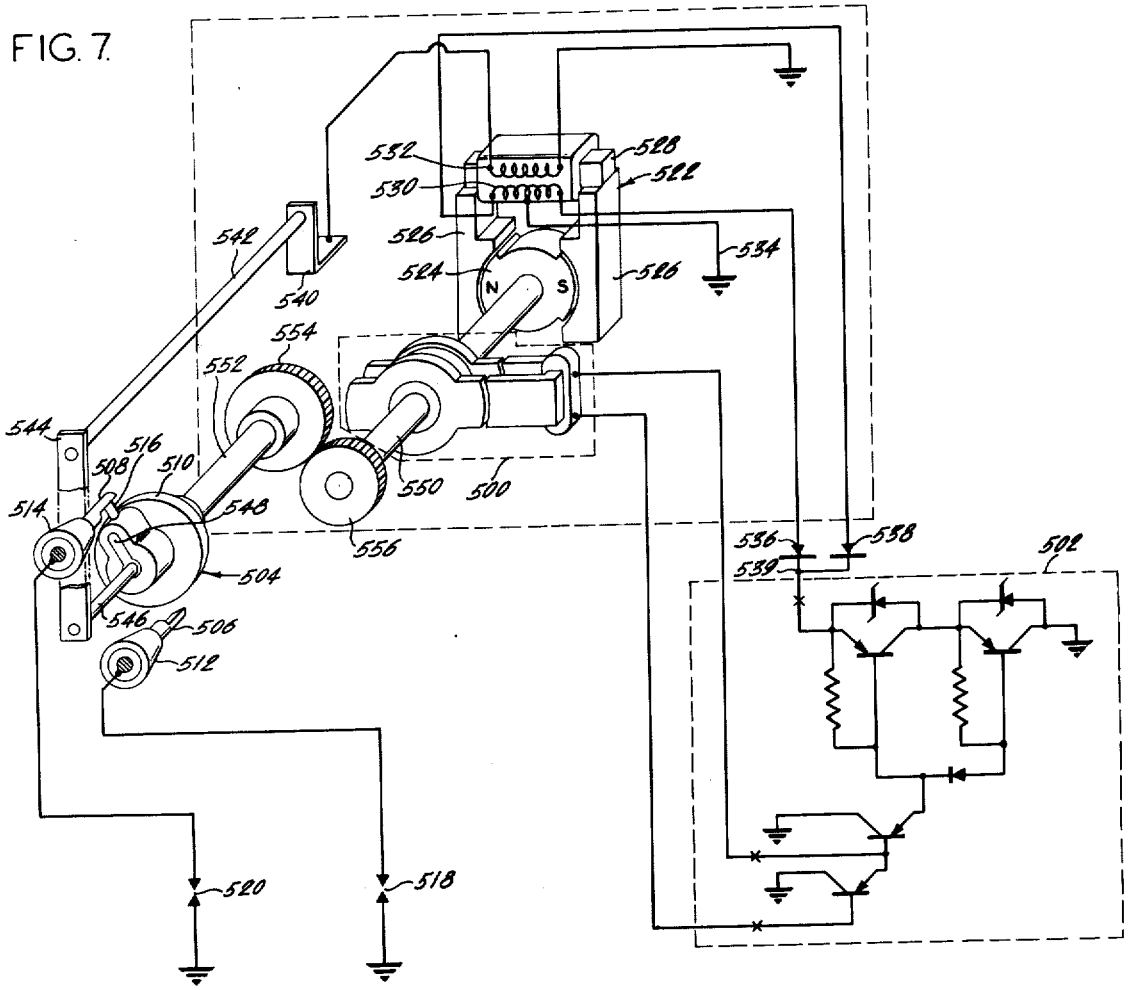
FIG. 7 is a schematic circuit diagram of an ignition system embodying another form of the present invention.

FIG. 7 illustrates a schematic diagram of an ignition system embodying the present invention used in connection with a high-tension ignition system. As has previously been explained, a high-tension system is one in which the high voltage sufficient to fire the spark plugs is generated in a secondary winding at the magneto. The system shown in FIG. 7 is otherwise similar to the system shown in FIG. 2. The triggering induction generator 500 and the electronically-controllable current-switching circuit 502 are of exactly the same construction as described in regard to the system shown in FIG. 2. For purposes of simplicity of illustration, the system shown in FIG. 7 is designed for operating a two cylinder engine. The distributor means generally designated 504 is shown having two metal electrodes 506 and 508 located in circumferentially-spaced relation with respect to rotor disc 510. The electrodes 506 and 508 are held in place by brush holders 512 and 514, respectively. As the rotor disc 510 rotates the conductive tip 516 carried by it comes in sufficiently close proximity to stationary electrodes 506 and 508 that the ignition voltage pulse is conducted from conductive tip 516 to one of the electrodes when the spark plugs are to be fired. The electrodes 506 and 508 are connected to electrical ground through spark plugs 518 and 520, respectively. It is to be understood that the system shown can be designed to fire more or less than two spark plugs without departing from the basic concept.

The ignition voltage pulses used to fire the spark plugs are generated by the magneto induction generator generally designated 522. The magneto induction generator consists of a rotor assembly 524 comprising a permanent magnet with north and south poles as designated thereon. The rotor assembly 524 revolves in a two-piece laminated magnetic frame structure 526 having a laminated magnetic core 528 around which are wound two coils forming a transformer having a primary winding 530 and a secondary winding 532. The primary winding is supplied with a center-tapped connection 534 to electrical ground and has its ends connected to the anodes of two diodes—one end to diode 536 and the other end to diode 538—to form a full wave rectifier circuit for providing pulses of the same polarity to terminal 539. The secondary winding 532 has one end connected to electrical ground and the other end connected in series with electrical connectors 540, 542, 544 and 546 to conductive members 548, which is electrically connected to conductive tip 516.

In operation of the electrical system of FIG. 7, as the permanent magnet of rotor assembly 524 rotates, an alternating magnetic flux is created in the magnetic frame and core structure, causing a build-up and collapse of flux lines within the windings, resulting in an induced [voltage] *current* within primary winding 530. During the build-up of [voltage] *current* in the primary winding, the current-switching circuit is in its high conduction state induced by the positive control pulse signal produced by the triggering rotor assembly and applied to the current-switching circuit, as previously described. [At] *Near* the point where flux reversal occurs, the maximum [voltage] *current* is induced in the primary winding 530 of the magneto. At that instant, the positive voltage control pulse will have ceased and the current-switching circuit 502 will have returned to its non-conductive state. Also, the negative voltage control pulse produced by the triggering rotor assembly is applied to the current-switching circuit, thereby further assuring that the current-switching circuit is rendered non-conductive. When the above occurs, the fast collapse of the magnetic field in the primary winding 530 will induce a high voltage in the secondary winding 532. The voltage induced in the secondary winding produces a current which is conducted through the electrical connectors and distributor to the one of the electrodes which at this instant is in close proximity to the conductive tip 516, as shown for electrode 508 and conductive tip 516. The voltage pulse supplied to the spark plug by this arrangement, is used to fire the spark plug, and hence the combustible fuel in the engine cylinder. The rotors of the magneto induction generator and the triggering inductive generator are rotated by shaft 550 in synchronism with the distributor rotor 510 on shaft 552, though gears 554 and 556. Thus, the proper sequence of timing is achieved by gearing between the rotors of the generators, the distributor rotor, and the engine crank shaft, as described in regard to FIG. 1.

Figure 8:
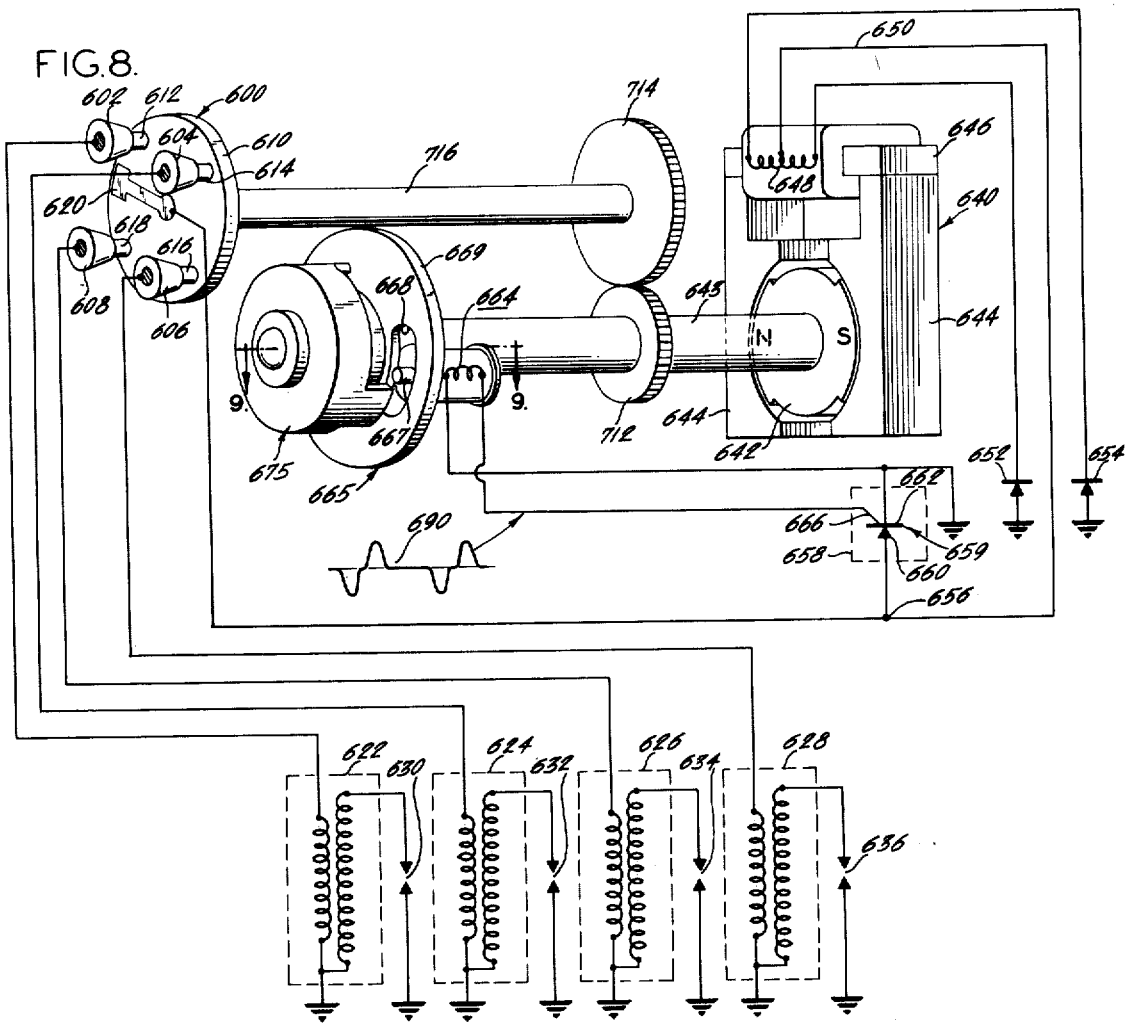
FIG. 8 is a representation, partially in perspective and partly schematic, of an ignition system embodying still another form of the present invention.

Referring to FIG. 8, a schematic diagram of an ignition system embodying another form of the present invention is shown. The voltage distributor means is shown comprising a distributor generally designated 600 having four electrical brush holders 602, 604, 606 and 608 located in circumferentially-spaced relation with respect to the distributor rotor disc 610. In each of the holders 602, 604, 606 and 608 there is located an electrical brush 612, 614, 616 and 618, respectively, in physical contact with the distributor rotor disc 610 so as to ride over it. The rotation of rotor disc 610 cause the brushes intermittently to make contact with conductive segment 620. Each of the electrical brushes is connected to the primary winding of a voltage step-up transformer which has its secondary connected across a spark plug to ground. Four voltage step-up transformers 622, 624, 626 and 628 are shown associated with spark plugs 630, 632, 634 and 636, respectively. The connection and operation of the distributor, transformers and spark plugs is the same as described in regard to FIG. 2.

The magneto induction generator generally designated 640, which produces the ignition pulses used to fire the spark plugs is similar to the magneto induction generator of FIG. 2. The magneto induction generator 640 comprises a rotor assembly 642 having a permanent magnet with north and south poles as indicated thereon. The rotor 642 rotates about shaft 643 in a two piece laminated magnetic frame structure 644 having a laminated magnetic core 646 around which an output coil 648 is wound. As the rotor 642 rotates within the frame structure, an alternating magnetic flux is created, in the magnetic frame and core structure, causing a build-up and collapse of the flux lines within the core 644 and output coil 648, resulting in an induced [voltage] *current* comprising pulses of alternately-opposite polarities within coil 648.

The alternately-opposite polarity [voltage] pulses produced by the magneto induction generator in the output coil 648 are converted to pulses of a same polarity by the rectifying means associated with the output coil 648. The rectifying means is provided by taking the output from the coil at center tap 650 and connecting the ends of output coil 648 to the cathodes of diodes 652 and 654, respectively, which have their anodes connected to electrical ground. By this arrangement, full wave rectification is provided to supply [voltage] pulses of a same polarity to terminal 656.

The [voltage] pulses supplied to terminal 656 from the output coil are applied across the parallel-connected circuit comprising in one branch the electronically-controllable current-switching circuit 658 and in the other branch the series circuit comprising the distributor 600 and associated spark plugs. The electronically-controllable current-switching circuit in this case is provided by a gate controlled switch 659 having an anode element 660 connected to terminal 656, a cathode element 662 connected to electrical ground and to one side of an induction coil 664 of the triggering induction generator 665, and a gate element 666 connected to the other end of induction coil 664. The gate controlled switch has a high conduction state and a low conduction state, and is actuatable between these states in response to an electrical control pulse signal applied to it.

Figure 9:
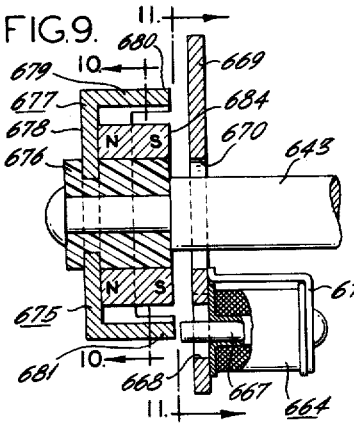
FIG. 9 is a sectional view of the triggering induction generator taken along the line 9—9 of FIG. 8.
Figure 11:
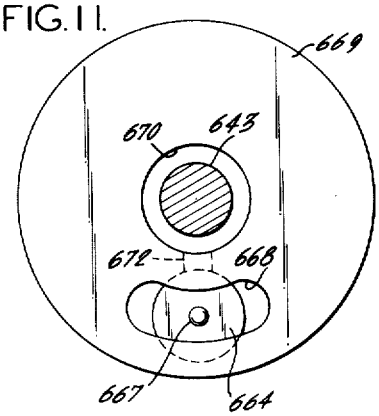
FIG. 11 is a sectional view of the apertured plate on which the triggering induction coil is supported, taken along line 11—11 of FIG. 9.

The gate controlled switch 659 is changed between its high and its low conduction states by the control pulse signal generated in induction coil 664 making the gate element negative with respect to the cathode element and applied between cathode element 662 and gate element 666, which serves as a control element for current between the anode and cathode. The induction coil 664 is wound around core 667, which is aligned through off-center kidney-shaped aperture 668 in circular apertured plate 669 attached to the frame (not shown). The apertured plate is made of a magnetic material and has a circular central opening 670, shown in FIG. 11, through which shaft 643 freely extends. As seen in FIG. 9, the coil 664 is held on apertured plate 669 by bracket 672 attached to the apertured plate as by spot welding.

Figure 10:
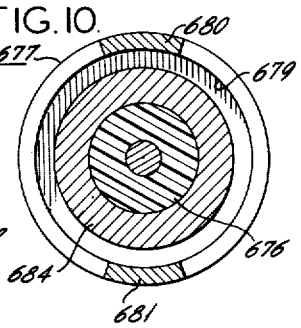
FIG. 10 is a sectional view of a triggering induction rotor taken along the line 10—10 of FIG. 9.

The trigger pulses are generated in the induction coil by the triggering induction rotor generally designated 675. As seen in FIGS. 9 and 10, the trigger induction rotor 675 comprises cylindrical non-magnetic spacer 676 located on a reduced diameter portion of shaft 643. Supported in a circular groove in the outside of the spacer 676 is cup-shaped pole piece 677 comprising a centrally-apertured circular plate 678 having a perpendicularly extending wall 679 around the periphery of the plate and diametrically opposed extensions 680 and 681 of the wall 679 forming pole pieces. The extensions 680 and 681 are at the same radial distance out from shaft 643 as aperture 668 in plate 669, and provide a path for the magnetic flux from ring magnet 676, which is fitted around spacer 676 and contacts the inside face of plate 678 of pole piece 677. The ring magnet 684 is face polarized as indicated thereon and may be cemented to the spacer 684.

In the operation of the triggering induction generator of FIGS. 8 and 9, when the rotor 675 is rotated the path of the magnetic flux emanating from magnet 684 is from the north pole of the magnet through the pole piece 677 and out extensions 680 and 681, across the small air gap to apertured plate 669, and back across the air gap to the south pole of the magnet. When the rotor assembly is rotated so as to move one of the extensions of the pole piece 677 over the region of the aperture in plate 669, the magnetic flux passes through core 667 associated with coil 664, then through bracket 672 to plate 669 and back to the magnet.

For each revolution of the triggering induction rotor, two positive and two negative voltage pulses are thereby produced across induction coil 664 having a waveform similar to that shown at 690.

In operation, as the build-up of the ignition voltage pulse takes place in the output coil 648, the current-switching circuit is actuated to its high conduction state. The condition of the current-switching circuit being in its high conduction state is caused by the negative control pulse signal generated by the triggering induction generator and applied between the gate element 666 and the cathode element 662 of the gate controlled switch 659. At the firing instant, the positive control pulse signal produced by the triggering induction generator will actuate the current-switching circuit to its low conduction state, and the current [produced by] *collapses to produce* the ignition voltage pulse, at substantially its maximum value, [will flow] *which is conducted* through the distributor to produce the voltage to fire the appropriate spark plugs, as described in regard to FIG. 2.

The proper sequence of timing is achieved by gearing between the rotor of magneto induction generator 640, the rotor of triggering inductive generator 665, the distributor rotor disc 610, and the engine crank shaft. As can be seen in FIG. 8, shaft 643 is attached directly to rotor 642 of the magneto induction generator and to rotor 675 of the triggering inductive generator. The gearing between shaft 643 and shaft 716 attached to distributor rotor disc 610 is provided by gears 712 and 714. By this arrangement, the proper timing for providing an ignition pulse to fire the spark plug is accomplished.

The present invention has been described with reference to specific embodiments and alternative embodiments of various portions of the system. It should be understood that each of the specific embodiments can employ substitution of parts disclosed in alternative embodiments, and substitution of equivalent parts from specific embodiments, without departing from the basic concept.

Other modifications of the present invention and its forms described herein will occur to those skilled in the art. All such modifications are intended to be within the scope and spirit of the present invention as defined by the appended claims.

I claim:

1. An ignition system for an internal combustion engine, comprising:

voltage-operable engine fuel igniting means for igniting combustible fuel in said engine;

distributor means having an input terminal, an output terminal, and an element movable in synchronism with said engine operation for connecting said input terminal intermittently to said output terminal;

an electronically-controllable current-switching circuit having a high conduction state and a low conduction state and actuatable between said states in response to electrical control pulses applied thereto;

means connecting said input and output terminals of said distributor means in common series circuit with said fuel igniting means, and connecting said current-switching circuit in parallel with said series circuit;

means for generating a series of [voltage] pulses in synchronism with operation of said engine, and for applying them across said series circuit; and means for generating a control pulse signal comprising pulses recurrent in synchronism with said engine operation, and for applying said signal to said current-switching circuit to actuate said current-switching circuit to said high conduction state during an interval of initial build-up of each of said [voltage] pulses of said series to a predetermined level and for actuating said current-switching circuit to said low conduction state during an interval in which each of said [voltage] pulses of said series exceeds said predetermined level.

2. The ignition system of claim 1 in which said means for generating a series of [voltage] pulses comprises a magneto induction generator for generating a series of [voltage] pulses of alternatively opposite polarity, and rectifying means for converting said alternatively opposite polarity pulses to pulses of a same polarity.

3. The ignition system of claim 1 in which said means for generating a control pulse signal comprising pulses recurrent in synchronism with said engine operation comprises an induction generator producing voltage pulses at its output.

4. The apparatus of claim 2 in which said engine fuel igniting means comprises a plurality of voltage step-up transformers having their primaries supplied with [said] voltage pulses from said magneto induction generator and having their secondaries connected across a spark plug used to ignite combustible fuel in cylinders of said engine.

5. The apparatus of claim 1 in which said electronically-controllable current-[swinging] *switching* circuit comprises a gate control switching circuit, said gate control switching circuit being responsive to said control pulse signal to change between its high and its low conduction states, thereby removing the shunt path through said gate control switching circuit [, whereby said voltage pulse is used to ignite said combustible fuel in said engine].

6. The apparatus of claim 1 in which said electronically-controllable current-switching circuit comprises a transistor switching circuit, said transistor being responsive to said control pulse signal to switch said transistor between its high and its low conduction states, thereby removing the current path through said transistor [, whereby said voltage pulse is used to ignite said combustible fuel in said engine].

7. The apparatus of claim 5 in which said gate control switching circuit comprises a gate controlled switch.

8. An ignition system for an internal combustion engine, comprising:

voltage-operable engine fuel igniting means for igniting combustible fuel in said engine;

distributor means having an input terminal, an output terminal, and an element movable in synchronism with said engine operation for connecting said input terminal intermittently to said output terminal;

an electronically-controllable current-switching circuit having a high conduction state and a low conduction state and actuatable between said states in response to electrical control pulses applied thereto;

means connecting said input and output terminals of said distributor means in common series circuit with said fuel igniting means, and connecting said current-switching circuit in parallel with said series circuit; and means for generating a series of [voltage] pulses in synchronism with operation of said engine and applying them across said series circuit, and for generating a control pulse signal comprising pulses recurrent in synchronism with said engine operation and applying said signal to said current-switching circuit to actuate said current-switching circuit to said high conduction state during an interval of initial build-up of each of said [voltage] pulses of said series to a predetermined level and for actuating said current-switching circuit to said low conduction state during an interval in which each of said [voltage] pulses of said series exceeds said predetermined level.

9. The ignition system of claim 8 in which said means for generating a series of [voltage] pulses and for generating a control pulse signal comprises a magneto induction generator having a first output coil for producing a series of [voltage] pulses of alternately opposite polarity and a second output coil for producing a control pulse signal of alternately opposite polarity, a first rectifying means for converting said output of said first output coil to a series of [voltage] pulses of a same polarity, and a second rectifying means for converting said output of said second output coil to a control pulse signal comprising a series of pulses of a same polarity.

10. An ignition system for an internal combustion engine comprising:

voltage-operable engine fuel igniting means for igniting combustible fuel in said engine;

distributor means having an input terminal, an output terminal, and an element movable in synchronism with said engine operation for connecting said input terminal intermittently to said output terminal;

an electronically-controllable current-switching circuit having a high conduction state and low conduction state and actuatable between said states in response to electrical control pulses applied thereto;

means connecting said input and output terminals of said distributor means in common series circuit with said fuel igniting means;

a transformer having a primary winding *on a stator core structure* in series with said current-switching circuit and a secondary winding *on said stator core structure* in series with said series circuit [, thereby to connect said current-switching circuit in parallel with said series circuit];

*first generating* means *comprising a magnetic circuit including a rotor, said stator core structure and said primary winding, and* for generating a series of [voltage] pulses in said primary winding in synchronism with operation of said engine; and

*second generating* means *including a control coil on said stator core structure* for generating a control pulse signal comprising pulses recurrent in synchronism with said engine operation *in said control coil,* and for applying said signal to said current-switching circuit to actuate said current-switching circuit to said high conduction state during an interval of initial build-up of each of said [voltage] pulses of said series to a predetermined level and for actuating said current-switching circuit to said low conduction state during an interval in which each of said [voltage] pulses of said series exceeds said predetermined level [.].

[whereby the portion of said voltage pulses of said series generated in said primary winding which exceeds said predetermined level induces a voltage in said secondary winding and said induced voltage in said secondary winding is supplied to said distributor means for igniting combustible fuel in said engine.]

11. In an engine system comprising an engine having a plurality of cylinders, a spark plug for each of said cylinders, means supplying combustible fuel to each of said plurality of cylinders, a distributor having an input terminal intermittently connectable to a plurality of output terminals thereon in synchronism with engine operation, means connecting each of said output terminals of said distributor in series with a different one of said spark plugs thereby to provide a series circuit comprising said distributor and said spark plugs, and a magneto induction generator for generating a series of [voltage] pulses of alternately opposite polarity, the combination therewith of:

an electronically-controllable current-switching circuit having a high conduction state and a low conduction state and actuatable between said states in response to electrical control pulses applied thereto;

means connecting said current-switching circuit in parallel with said series circuit;

rectifying means for converting said alternately opposite polarity [voltage] pulses to pulses of a same polarity, and for applying them across said series circuit; and means for generating a control pulse signal comprising pulses recurrent in synchronism with said engine operation, and for applying said signal to said current-switching circuit to actuate said current-switching circuit to said high conduction state during an interval of initial build-up of each of said [voltage] pulses of said series to a predetermined level and for actuating said current-switching circuit to said low conduction state during an interval in which each of said [voltage] pulses of said series exceeds said predetermined level.

*12. An ignition system for an internal combustion engine, comprising:*

*electrical generating means including a magnetic circuit having a single rotor and a single stator core structure with first coil means on the stator for generating a voltage potential in synchronism with operation of said engine and second coil means on the stator core structure for generating a control signal in synchronism with operation of said engine,*

*engine fuel igniting means for igniting combustible fuel in said engine,*

*switch means for selectively causing said voltage potential generated by said first coil means to be applied to said igniting means, and*

*means connecting the control signal to said switch means for causing said switch means to permit said voltage potential to be applied to said igniting means.*

*13. The ignition system of claim 12 in which said switch means is a silicon-controlled rectifier.*

*14. The ignition system of claim 12 in which said electrical generating means comprises a magneto induction generator.*

*15. In combination with a generating device for generating power and including a single magnetic circuit having a single rotor and a single stator core structure with first coil means, the rotor being adapted to be driven by the engine which has a spark ignition system, the improvement comprising: energy storage means associated with the generating device for storing energy and for delivering pulses of electrical energy to the ignition system responsively to trigger signals, and generating means including second coil means on the stator core structure*

*responsive to the positional relationship between the rotor and stator completing the magnetic circuit for providing said trigger signals as the rotor and stator are relatively rotated.*

*16. In an ignition system for an engine having ignition means and comprising a generating device for generating energy including a magnetic circuit having a single stator core structure with first coil means and a single rotor adapted to be driven by the engine, energy storage means associated with the generating device for storing energy and for delivering pulses of electrical energy to the ignition means, switch means responsive to trigger signals for selectively causing the energy storage means to deliver the pulses to the ignition means, and generating means including second coil means on the stator core structure responsive to the positional relationship between the rotor and stator completing the magnetic circuit for providing said trigger signals as the rotor and stator are relatively rotated.*

*17. An ignition system for an internal combustion engine, comprising:*

*electrical generating means including a magnetic circuit having one rotor and one stator core structure with first and seconds coils thereon, the first coil for generating a voltage potential in synchronism with operation of said engine and the second coil for generating a control signal in synchronism with operation of said engine,*

*engine fuel igniting means responsive to the voltage potential for igniting combustible fuel in said engine,*

*switch means responsive to a control signal for selectively causing said voltage potential to be applied to said igniting means, and*

*means connecting the control signal of said electrical generating means to said switch means for actuating said switch means to cause said voltage potential to be applied to said igniting means.*

*18. An ignition system for an internal combustion engine, comprising:*

*engine fuel ignition means for igniting combustible fuel in the engine,*

*electrical generating means including a magnetic circuit having a single rotor and a single stator core structure supporting a magneto coil for generating a voltage potential in synchronism with operation of the engine applied to the engine fuel igniting means,*

*switch means connected to the electrical generating means for providing the occurrence of a voltage potential to operate the engine fuel ignition means as the switch means is switched from a first state to a second state, and*

*a control coil supported by the stator core structure and connected to the switch means, the control coil being cooperable with the rotor for generating a control signal in synchronism with engine operation to cause the switch means to switch from the first state to the second state.*

*19. An ignition system for an internal combustion engine, comprising:*

*electrical generating means including a magnetic circuit having a single rotor and a single stator core structure supporting a magneto coil for generating a voltage potential in synchronism with operation of the engine,*

*engine fuel ignition means responsive to the voltage potential for igniting combustible fuel in the engine,*

*switch means connected in a circuit with the magneto coil for closing and opening the circuit to permit and interrupt the flow of current through the magneto coil for causing a voltage potential to operate the engine fuel ignition means, and*

*a control coil supported by the stator core structure and connected to the switch means, the control coil being cooperable with the rotor for generating a control signal in synchronism with engine operation for switching the switch means to close and open the circuit.*

References Cited

The following references, cited by the Examiner, are of record in the patented file of this patent or the original patent.

UNITED STATES PATENTS

| | | | |
|---|---|---|---|
| 3,311,783 | 3/1967 | Gibbs et al. | 123—148 X |
| 3,358,665 | 12/1967 | Carmichael et al. | 123—148 E |
| 3,152,281 | 10/1964 | Robbins. | |
| 3,178,608 | 4/1965 | McKendry. | |
| 3,186,397 | 6/1965 | Loudon | 123—148 |
| 3,202,904 | 8/1965 | Madland. | |
| 3,240,198 | 3/1966 | Loudon et al. | 123—148 |

LAURENCE M. GOODRIDGE, Primary Examiner

U.S. Cl. X.R.

123—148 E

UNITED STATES PATENT OFFICE

CERTIFICATE OF CORRECTION

Patent No. RE 28,392 Dated April 15, 1975

Inventor(s) Bobby E. McMillen

It is certified that error appears in the above-identified patent and that said Letters Patent are hereby corrected as shown below:

Column 4, line 47, reads: "distributor means and spark plugs when the distributor means completes the circuit to fire the spark plugs, since ..." should read: --distributor means and spark plugs to fire the spark plugs when the distributor means completes the circuit, since--;

Column 7, line 20, "traansformer" should be --transformer--;

Column 8, line 23, "ad" should be --and--;

Column 10, line 19, "cause" should be --causes--;

Column 11, line 45, "ignition voltage pulse" should be --[ignition voltage] current pulse--; and Column 15, line 24, "seconds" should be --second--.

Signed and Sealed this twenty-third Day of December 1975

[SEAL]

Attest:

RUTH C. MASON
*Attesting Officer*

C. MARSHALL DANN
*Commissioner of Patents and Trademarks*